United States Patent [19]

Tanibuchi et al.

[11] Patent Number: 4,535,119
[45] Date of Patent: Aug. 13, 1985

[54] RUBBER COMPOSITION FOR COATING TIRE CORD

[75] Inventors: Teruo Tanibuchi, Ichihara; Koji Ishiguchi, Chiba; Shinji Yamamoto, Yotsukaido, all of Japan

[73] Assignee: 501 UBE Industries, Ltd., Ube, Japan

[21] Appl. No.: 606,970

[22] Filed: May 4, 1984

[30] Foreign Application Priority Data

May 6, 1983 [JP] Japan ................................. 58-78306

[51] Int. Cl.$^3$ ............................................. C08K 3/04
[52] U.S. Cl. ................................... 524/496; 524/504; 525/63
[58] Field of Search ................... 524/496, 504; 525/63

[56] References Cited

U.S. PATENT DOCUMENTS 4,251,409  2/1981  Neubert .............................. 524/504
4,355,131  10/1982 Wise .................................... 524/501

OTHER PUBLICATIONS

Derwent Abstract 06652 D/05, Bridgestone Tire KK (J55151053), Nov. 1980.

Primary Examiner—Herbert J. Lilling
Attorney, Agent, or Firm—Finnegan, Henderson, Farabow, Garrett & Dunner

[57] ABSTRACT

A rubber composition for coating a tire cord comprising:
(A) a reinforced rubber composition comprising vulcanizable rubber including 5 to 100 parts by weight, based on 100 parts by weight of the rubber, of fine short fibers of thermoplastic polymer having

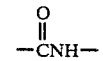

group buried therein, said vulcanizable rubber and said thermoplastic polymer being grafted to the vulcanizable rubber through a phenol formaldehyde resin precondensate at an interface of the fiber;
(B) a diene rubber; and
(C) carbon black, wherein the following conditions (i) to (iv) are satisfied:
  (i) the amount of the thermoplastic rubber is 1 to 15 parts by weight based on 100 parts by weight of the total amount of the rubber constituents;
  (ii) the ratio of the rubber is such that the total amount of natural rubber or polyisoprene in the component (A) and the component (B) is 100% to 65% by weight;
  (iii) the amount of the carbon black is 50 to 70 parts by weight based on 100 parts by weight of the total amount of the rubber constituents; and
  (iv) the vulcanizate derived from the rubber composition has a 100% modulus of at least 60 kg/cm$^2$.

3 Claims, No Drawings

RUBBER COMPOSITION FOR COATING TIRE CORD

BACKGROUND OF THE INVENTION

1. Field of the Invention

The present invention relates to a rubber composition for coating a tire cord for a carcass or belt. More specifically it relates to a rubber composition for coating a tire cord having a reduced die swell and Mooney viscosity (ML), excellent workability (or processability), and satisfactory bonding property to a metal.

2. Description of the Prior Art

From the viewpoints of high speed durability and high speed steering property, steel cords are also used in radial tires. Where steel cords are used, a very high strain is likely to be concentrated on the rubber near the steel cords during tire running. Therefore, rubber for steel cord is required to have a high modulus of elasticity and an excellent bonding property to a metal. Also with radial tires or bias tires using organic fiber cords, rubber having a high modulus of elasticity is preferably used as the rubber for coating the cord, from the viewpoint of durability.

Various methods have been heretofore attempted for obtaining rubber having a high modulus of elasticity. A method comprising the addition of a large amount of carbon black involves an operational problem in that the workability of the rubber composition in a Banbury mixer is poor. In addition, the composition has an increased viscosity which generates a large amount of heat in an extruder, and thus, may cause scorching. In a method comprising the addition of a large amount of sulfur, blooming of the sulfur occurs and the vulcanizates derived from such a composition exhibit remarkably deteriorated physical properties, including flex resistance. A method comprising the addition of a thermosetting resin is disadvantageous in that since the thermosetting resin has a low compatibility with a diene rubber, which is usually used as the rubber for coating a cord, it is not uniformly dispersed throughout the composition, with the result that the resultant vulcanizate exhibits a poor crack resistance.

Also, conventional rubber compositions for coating a tire cord have a low green strength. Therefore, there is a desire for rubber compositions for tire cord coating having a high green strength from the viewpoint of workability.

SUMMARY OF THE INVENTION

Accordingly, the object of the present invention is to eliminate the above-mentioned disadvantages of the prior art and to provide a rubber composition for coating a tire cord for a carcass or belt which has a low die swell and ML and is capable of providing a vulcanizate having a high modulus of elasticity.

Other objects and advantages of the present invention will be apparent from the following description.

In accordance with the present invention there is provided a rubber composition for coating a tire cord, comprising:

(A) a reinforced rubber composition comprising vulcanizable rubber including 5 to 100 parts by weight, based on 100 parts by weight of the rubber, of fine short fibers of thermoplastic polymer having

groups buried therein, said vulcanizable rubber and said thermoplastic polymer being grafted to each other through a phenol formaldehyde resin precondensate at an interface of the fiber;

(B) a diene rubber; and (C) carbon black;

wherein the following conditions (i) through (iv) are satisfied:

(i) the amount of the thermoplastic rubber is 1 to 15 parts by weight based on 100 parts by weight of the total amount of the rubber constituents;

(ii) the ratio of the rubber is such that the total amount of natural rubber or polyisoprene in the component (A) and is 100% to 65% by weight;

(iii) the amount of the carbon black is 50 to 70 parts by weight based on 100 parts by weight of the total amount of the rubber constituents; and (iv) the vulcanizate derived from the rubber composition has a 100% modulus of at least 60 kg/cm$^2$.

DESCRIPTION OF THE PREFERRED EMBODIMENTS

The rubber composition for tire cord coating according to the present invention has an $ML_{1+4}$ (100° C.) (hereinafter abbreviated as ML) of not more than 70, a swell ratio on extrusion at 100° C. and a shear rate of 360 sec$^{-1}$ (hereinafter abbreviated as swell ratio) of not more than 1.8, a 100% green modulus of at least 10 kg/cm$^2$, a 100% modulus (hereinafter abbreviated as $M_{100}$) of the vulcanizate of at least 60 kg/cm$^2$, a bonding strength to a metal, defined in ASTM D2229, (hereinafter abbreviated as a bonding strength to a metal) of at least 10 kg, and excellent moldability and processability, and is capable of providing a vulcanizate having excellent physical properties.

In the present invention, it is essential to incorporate into the rubber composition a reinforced rubber composition comprising vulcanizable rubber including fine short fibers of thermoplastic polymer having

groups buried therein, wherein the vulcanizable rubber and the thermoplastic polymer are grafted to each other through a phenol formaldehyde resin precondensate at an interface of the fiber; and the ratio of the fiber to the vulcanizable rubber is 5 to 100 parts by weight, preferably 20 to 100 parts by weight, based on 100 parts by weight of the rubber. This incorporation of the reinforced rubber composition makes it possible to obtain a rubber composition having excellent moldability and processability in spite of the incorporation of the polymer fiber.

Examples of the vulcanizable rubber are natural rubber, cis-1,4-polybutadiene, polyisoprene, styrene-butadiene copolymer rubber, and isoprene-isobutyrene copolymers. The preferred rubber is natural rubber.

The fine short fiber of thermoplastic polymer is made of a thermoplastic polymer having

groups in the molecule thereof and a melting point of 190° C. to 235° C., preferably 190° C. to 225° C., more preferably 200° C. to 220° C., such as nylon, for example, nylon 6, nylon 610, nylon 12, nylon 611 and nylon 612, polyureas, for example, polyheptamethylene urea and polyundecamethylene urea, and polyurethanes. The fine short fiber is preferably made of nylon. The fine short fibers have a circular cross-section having an average diameter of 0.05 to 0.8 μm. The shortest length of the fine short fibers is preferably 1 μm or more. The molecules of the thermoplastic resin are preferably oriented in the direction of the fiber axis. These fine short fibers are buried in the vulcanizable rubber.

The thermoplastic polymer having

groups in the molecule thereof and the vulcanizable rubber are grafted to each other through a phenol formaldehyde resin precondensate at an interface of the fiber.

Examples of the phenol formaldehyde precondensate are a resol type phenol formaldehyde resin precondensate and a novolak type phenol formaldehyde resin precondensate. The preferred precondensate is the novolak type phenol formaldehyde resin precondensate (hereinafter referred to as novolak).

The novolaks usable in the present invention are soluble and meltable resins and their modified products, obtained from condensation reactions of phenols such as phenol or bisphenol with formaldehyde (or paraformaldehyde) in the presence of an acidic catalyst known per se, such as sulfuric acid, hydrochloric acid, phosphoric acid, or oxalic acid. Examples of the novolaks desirably usable in the present invention are novolak type phenol formaldehyde resin precondensates, novolak type lactambisphenol F-formaldehyde resin precondensate, and novolak type styrenated phenol-phenol-formaldehyde resin precondensate.

In the present invention, since the strength of the fine short fibers of the thermoplastic polymer having

groups buried in the vulcanizable rubber in the reinforced rubber composition used is strong, and since the thermoplastic polymer and the vulcanizable rubber are grafted to each other through, preferably, the novolak at an interface of the short fiber, a rubber composition having a low ML and die swell and a high green strength can be obtained.

In the present invention, there is used a reinforced rubber composition in which the ratio of the fine short fibers of the thermoplastic polymer having

groups buried in the vulcanizable rubber and grafted thereto, to the vulcanizable rubber, is 5 to 100 parts by weight based on 100 parts by weight of the rubber. Particularly, in the present invention, the thermoplastic polymer forming the fiber and the vulcanizable rubber are preferably grafted to each other through, preferably, the novolak in a graft ratio of 3 to 25% by weight, preferably 5 to 20% by weight, the graft ratio being defined as the ratio of the weight of the vulcanizable rubber grafted to the thermoplastic polymer through the novolak at an interface of the fiber to the weight of the fine fibers of the thermoplastic polymer buried in the vulcanizable rubber (the vulcanizable rubber/the fine short fibers of the thermoplastic polymer).

The reinforced rubber composition of the present invention having the above-mentioned features can be prepared in the following manner. For example, the vulcanizable rubber, the thermoplastic polymer having

groups in the polymer molecule and having a molecular weight of less than 200000, 0.2 to 5 parts by weight, based on 100 parts by weight of the total amount of the rubber and the thermoplastic polymer, of the novolak type phenol formaldehyde resin precondensate, and a formaldehyde producing compound are mixed together at a temperature of not less than the melting point of the thermoplastic polymer, but not more than 270° C. When the ratio of the rubber and the thermoplastic polymer in the resultant mixture is 5 to 100 parts by weight of the thermoplastic polymer, based on 100 parts by weight of the rubber, the mixture is directly subjected to extrusion. When the ratio of the rubber and the thermoplastic polymer in the mixture is more than 5 parts by weight of the thermoplastic polymer, based on 100 parts by weight of the rubber, if necessary, the vulcanizable rubber is additionally added to the mixture in an amount such that the amount of the thermoplastic polymer is 5 to 100 part by weight based on 100 parts by weight of the total amount of the vulcanizable rubber, and the resultant mixture is mixed at a temperature of not less than the melting point of the thermoplastic polymer but not more than 270° C., after which it is subjected to extrusion. The extrusion procedure is carried out at a temperature of not less than the melting point of the thermoplastic polymer but not more than 270° C. Then, the extrudate is drawn at a temperature of less than the melting point of the thermoplastic polymer.

As the formaldehyde producing compound, there are used those compounds capable of producing formaldehyde upon heating. Examples of the formaldehyde producing compounds are hexamethylene tetramine, acetaldehyde ammonia

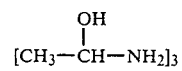

paraformaldehyde, 2-polyoxymethylene, polyhydric methylol melamine derivatives, oxazolidine derivatives, and polyhydric methylol acetylene urea.

The ratio of the vulcanizable rubber and the thermoplastic polymer having

groups in the polymer molecule in the above-mentioned mixture is not particularly limited. Usually, the ratio of the vulcanizable rubber and the thermoplastic polymer is 5 to 2000 parts by weight, preferably 5 to 100 parts by weight, of the thermoplastic polymer, based on 100 parts by weight of the rubber.

The mixing of the vulcanizable rubber, the thermoplastic polymer having

groups in the polymer molecule, the novolak, and the formaldehyde producing compound is carried out at a temperature of not less than the melting point of the thermoplastic polymer, desirably not less than 5° C. plus the melting point of the thermoplastic polymer, but not more than 260° C., at which a mixture of the rubber, the thermoplastic polymer, the novolak, and the formaldehyde producing compound is in a melt state of a kind. The mixing of these constituents is carried out using a Brabender-Plastograph, a Banbury mixer, a roll mill, an extruder or the like for, desirably, 1 to 15 minutes.

The order of the addition of the above-mentioned constituents to a mixing device such as a Brabender-Plastograph is not specifically limited. However, the following method is preferably used. That is, the vulcanizable rubber and, optionally, an antioxidant are first charged into a mixing device to effect mastication of the rubber. Then, the thermoplastic polymer having

groups is charged into the mixing device to effect the mixing. The thermoplastic polymer is melted during the mixing and, as a result, the thermoplastic polymer is dispersed in the vulcanizable rubber. Thereafter, the novolak is charged into the mixing device. After mixing, the formaldehyde producing substance is charged, and the mixing is effected for 1 to 15 minutes.

When the vulcanizable rubber, the thermoplastic polymer having

groups in the polymer molecule, the novolak and the formaldehyde producing substance are mixed in the above-mentioned manner, the vulcanizable rubber and the thermoplastic polymer are grafted to each other through the novolak, and the thermoplastic polymer is uniformly and finely dispersed in the vulcanizable rubber. The particle size of the dispersed thermoplastic polymer is generally 1 to 2 μm.

In the present invention, it is essential to use, as the polymer forming the fiber, the thermoplastic polymer having

groups in the polymer molecule. When the thermoplastic polymer having no

groups in the polymer molecule is used, even if it is film-forming, the particle size of the dispersed thermoplastic polymer is large and fibers having a large diameter and film of the thermoplastic polymer are formed, with the result that graft bonding between the thermoplastic polymer and the rubber does not occur at an interface of the fiber. Therefore, such a thermoplastic polymer cannot be used in the present invention.

In the above-mentioned method, in order to prevent gelation of the vulcanizable rubber during the mixing step of the constituents and the subsequent extruding step, it is preferable to compound a low volatile antioxidant in the vulcanizable rubber. Examples of such antioxidants are N-(3-methacryloyloxy-2-hydroxypropyl)-N'-phenol-p-phenylenediamine, phenyl-2-napthylamine, phenyl-β-naphthylamine, N,N'-diphenyl-p-phenylenediamine, N-isopropyl-N'-phenyl-p-phenylenediamine, N-cyclohexyl-N'-phenyl-p-phenylenediamine, 2,6-di-tert-butyl-4-methylphenol, 2,6-di-tert-butyl-2-dimethylamine-p-cresol, and 2,2'-dihydroxy-3,3'-bis(2-methylcyclohexyl)-5,5'-dimethyldiphenylmethane.

In the above-mentioned method, the mixture obtained after the constituents are mixed in the above-mentioned manner can be directly extruded as long as the ratio of the thermoplastic polymer having

groups in the polymer molecule to the vulcanizable rubber in the mixture is 5 to 100 parts by weight, desirably 20 to 100 parts by weight, based on 100 parts by weight of the vulcanizable rubber. However, when the ratio of the thermoplastic polymer to the vulcanizable rubber is more than 5 parts by weight based on 100 parts by weight of the vulcanizable rubber, an additional amount of vulcanizable rubber selected from the above-mentioned vulcanizable rubbers can be added to the mixture so that the ratio of the thermoplastic polymer to the vulcanizable rubber in the resultant mixture is within the range of 5 to 100 parts by weight, desirably 20 to 100 parts by weight, based on 100 parts by weight of the total amount of the vulcanizable rubber. Then, the mixture is mixed at a temperature of not less than the melting point of the thermoplastic polymer but not more than 270° C., preferably not less than 5° C. plus the melting point of the thermoplastic polymer but not more than 260° C., after which it is extruded.

The mixture can be extruded through a die having a circular or rectangular extruding nozzle, for example, a circular die or rectangular die, to form an extrudate in the form of a strand or sheet. Where a circular die is used, it is desirable that the circular die have an inner diameter of the extruding nozzle of 0.1 to 5 mm and a ratio (L/D) of the length of the extruding nozzle to the inner diameter of 1 to 20. When a rectangular die is used, it is desirable that the rectangular die have a slit gap of 0.1 to 5 mm, a width of 0.2 to 200 mm and a length of the die land of 10 to 20 mm.

Of the above-mentioned dies, the use of a circular die is desirable. As the circular die, those having one extruding nozzle and many extruding nozzles (i.e., multifold type) can be used.

The mixture is preferably extruded by any conventional extruder, e.g., a screw type extruder at a screw end temperature of not less than the melting point of the thermoplastic polymer but not more than 270° C. and a die temperature of not less than the melting point of the thermoplastic polymer but not more than 270° C., desirably not less than 5° C. plus the melting point of the thermoplastic polymer but not more than 260° C.

In the above-mentioned method, the extrudate obtained by extruding the mixture in the above-mentioned is in such a state that the thermoplastic polymer in the vulcanizable rubber is in the form of a fiber and the thermoplastic polymer and the vulcanizable rubber are grafted to each other through the novolak at an interface of the fiberous thermoplastic polymer.

The extrudate obtained above is cooled to a temperature of less than the melting point of the thermoplastic polymer by air cooling, water cooling, or cooling in which an organic solvent, such as cooled methanol, inert to the thermoplatic polymer is used, or by making the distance between the die and the winding machine (or take-up machine) longer, desirably while the extrudate is continuously stretched. The cooled extrudate is wound by a winding machine such as a bobbin or take-up rolls at a winding speed of 1 to 100 m/min, desirably 20 to 40 m/min according to a method known per se. Thereafter, the extrudate is rolled by means of a pair of pressure rolls or is subjected to a uniaxial drawing by means of a pair of draft rolls. Thus, the reinforced rubber composition usable in the present invention is obtained.

The desirable temperature of the winding machine during winding of the extrudate is 0° C. to 100° C. When the extrudate is taken-up or wound without cooling, a portion of the fibrous thermoplastic polymer often becomes flat (a film in the extreme case) and, therefore, it is likely that good results cannot be obtained. The desirable pressure roll temperature is 0° C. to 100° C. The drawing by the draft rolls is desirably carried out at a draw ratio of 1.1 to 10.

In the above-mentioned method, the molecules of the fibrous thermoplastic polymer dispersed in the vulcanizable rubber of the resultant reinforced rubber composition is oriented parallel to the fiber axis direction by drawing the extrudate in the above-mentioned manner. Thus, fine short fibers of the thermoplastic polymer having a high strength are formed in the resultant reinforced rubber composition.

The reinforced rubber composition obtained by the above-mentioned method is such that it contains 5 to 100 parts by weight of the thermoplastic polymer having

groups in the form of fine short fibers, based on 100 parts by weight of the vulcanizable rubber, and the thermoplastic polymer and the vulcanizable rubber are grafted to each other through the novolak at an interface of the fiber.

The rubber composition for tire cord coating according to the present invention comprises (A) the above-mentioned reinforced rubber composition, (B) a diene rubber, and (C) carbon black.

Examples of the diene rubber (B), are natural rubber, polyisoprene cis-1,4-polybutadiene, styrene-butadiene copolymer rubber, isoprene-isobutylene copolymers.

Desirable carbon blacks usable in the present invention are those having a particle diameter of 90 m$\mu$ or less, preferably 20 to 90 m$\mu$, and a dibutyl phthalate (DBP) oil absorption of 70 ml/100 g or more, preferably 70 to 150 ml/100 g. Examples of the carbon black are various carbon blacks such as FEF, FF, GPF, SAF, ISAF, SRF, and HAF.

The above-mentioned constituents are compounded in amounts such as to satisfy the following conditions:

(i) The amount of the thermoplastic polymer (short fiber) is 1 to 15 parts by weight, desirably 2 to 10 parts by weight, based on 100 parts by weight of the total amount of the rubber constituents.

(ii) The ratio of the rubber is such that the total amount of the natural rubber or polyisoprene in the component (A) and the component (B) is 100 to 65% by weight.

(iii) The amount of the carbon black is 50 to 70 parts by weight based on 100 parts by weight of the total amount of the rubber constituents.

(iv) The vulcanizate derived from the composition has a 100% modulus of at least 60 kg/cm$^2$.

When the amount of the thermoplastic polymer is less than the above-mentioned lower limit, a rubber composition having a low die swell and ML and a high green strength cannot be obtained. On the other hand, when the amount of the thermoplastic polymer is more than the above-mentioned upper limit, the bonding property of the rubber composition to a metal tends to decrease. When the compounding ratio of the natural rubber or the polyisoprene is outside the above-mentioned range, the strength of the vulcanizate and the bonding strength of the rubber composition to a cord are liable to decrease. When the amount of the carbon black is less than the lower limit, the modulus of elasticity of the vulcanizate is low, while when the amount of the carbon black is more than the above-mentioned upper limit, the ML of the rubber composition is large. Also, when the M$_{100}$ of the vulcanizate is outside the above-mentioned range, such a rubber composition is not suitable for coating a tire cord.

The tire cord-coating rubber composition of the present invention can be obtained by mixing the above-mentioned constituents at a temperature of 50° C. to 180° C. for approximately 1 to 60 minutes by using a mixing device such as a Banbury mixer or a roll mill.

The tire cord-coating rubber composition of the present invention may contain additives such as vulcanizing agents. Examples of the vulcanizing agent are conventional vulcanizing agents, such as sulfur, organic peroxides, and sulfur-containing compounds. The method of the compounding of the vulcanizing agent into the rubber composition is not specifically limited. Any compounding method known per se can be used. The rubber composition may contain, in addition to the vulcanizing agent, reinforcing agents such as white carbon, activated calcium carbonate, ultrafinely powdered magnesium silicate, high styrene resin, cumarone-indene resin, phenol resin, lignin, modified melamine resin, and petroleum resin; fillers such as various grades of calcium carbonate, basic magnesium carbonate, clay, zinc oxide, diatomaceous earth, reclaimed rubber, powdered rubber, and ebonite powder; vulcanization accelerators such as aldehyde, ammonias, aldehydeamines, guanidines, thioureas, thiazoles, thiurams, dithiocarbamates, and xanthates; vulcanization accelerator aids such as metal oxides and fatty acids; sulfur- or phosphorus-containing antioxidants, and naphthenic or aromatic process oils. These additives are compounded in amounts such as will not damage the effects of the present invention.

Especially, it is desirable that the rubber composition of the present invention contains the cobalt salt of an organic carboxylic acid having 6 or more carbon atoms (e.g., cobalt octoate, cobalt stearate, cobalt naphthenate, and cobalt benzoate) in an amount of 0.1 to 10 parts by weight based on 100 parts by weight of the total amount of the rubber constituents.

Since the rubber composition of the present invention has a low die swell and Mooney viscosity and a high green strength, the workability is excellent, the $M_{100}$ of the vulcanizate is high, and the bonding strength to a metal is high, i.e., 7 to 30 kg, preferably 10 to 30 kg, determined according to an ASTM D 2229 method. Therefore, the rubber composition of the present invention can be used as tire members for automobiles, buses, trucks, airplanes, and the like together with other tire members such as sidewall, tread, chafer, rim, and bead, in place of a conventional rubber composition for coating a tire cord such as a carcass or belt.

EXAMPLES

The present invention now will be further illustrated by, but is by no means limited to, the following Examples and Comparative Examples, in which all parts are expressed on a weight basis.

The swell ratio of the unvulcanized rubber composition was determined at a die L/D of 2 mm/1 mm, an extruding temperature of 100° C., and a shear rate of 360 $sec^{-1}$ by using a capillary rheometer. The Mooney viscosity $ML_{1+4}$ (100° C.) of the unvulcanized rubber composition was determined according to a JIS K 6300 method. The green modulus of the unvulcanized rubber composition was determined by punching, as a testpiece, a dumbbell No. 3 from the rubber composition and by subjecting the testpiece to measurement at room temperature and a pulling rate of 200 mm/min. The physical properties (tensile strength, tear strength, tensile stress) of the vulcanizate were determined according to JIS K 6301 methods. The peeling strength of the vulcanizate was obtained by determining the bonding property thereof to a natural rubber vulcanizate. The bonding strength of the vulcanizate to a metal was determined according to an ASTM D 2229 method.

EXAMPLE 1

100 parts of natural rubber (NR) having a viscosity of $1 \times 10^6$ poise and 1.0 part of N-(3-methacryloyloxy-2-hydroxypropyl)-N'-phenyl-p-phenylene-diamine (Knocklack G-1, manufactured by Ouchi Shinko Kagakukogyo Co. Ltd.) were charged into a Banbury mixer and were masticated at a temperature of 150° C. at a revolution number of 150 rpm. Then, 50 parts of 6-nylon (trade name: 1030B, manufactured by Ube Kosan Co., Ltd., melting point 221° C., molecular weight 30000) was charged and was mixed for 4 minutes. During mixing, the temperature in the mixer was raised to 230° C. and the 6-nylon was melted.

Next, 2.25 parts of a novolak type phenol formaldehyde precondensate (trade name 550 PL, manufactured by Meiwa Kasei Co., Ltd.) in the form of powdered crystals, which was obtained from the condensation of phenol with paraformaldehyde in the presence of a catalyst consisting of oxalic acid and had a softening point of 106° C., a water content of 0.12% by weight, and a free phenol content of 0.13% by weight, was charged and was mixed for 7 minutes. Thereafter, 0.225 part of hexamethylene-tetramine was charged and was mixed for 2.5 minutes (during this mixing, the temperature in the Banbury mixer was 230° C.) to effect a graft reaction, after which the mixture was dumped from the mixer.

The resultant mixture was extruded at a die temperature of 235° C. into a strand by using a 20 mmØ extruder provided with a circular die having an inner nozzle diameter of 2 mm and a ratio (L/D) of a length L to an inner diameter D of 2 (manufactured by Hoake Co.). The strand was wound on a bobbin through a funnel located at a position perpendicularly downward from the nozzle and guide rolls at a draft ratio of 9 at a winding rate of 35 m/min. The funnel was assembled in such a manner that a cooling water having a temperature of 0° C. was circulated through the funnel to a cooling water reservoir located at a position perpendicularly downward from the funnel by means of a pump and a piping system. The wound strand was vacuum dried at a room temperature for one day to remove the attached water therefrom. 500 pieces of the strands were bundled into a sheet-like material having a thickness of 2 mm and a width of 150 mm. The sheet-like material was rolled by using a pair of pressure rolls having a temperature of 60° C. and a roll nip of 0.2 mm at a rolling ratio of about 10 to obtain a reinforced rubber composition (master batch) (sample 1).

The formulation, shown in Table 2, excluding a vulcanization accelerator and sulfur was mixed in a Banbury mixer at a temperature of 90° C. at a revolution number of 77 rpm to obtain a mixture which is a rubber composition for coating a cord. Then, the mixture was mixed with the vulcanization accelerator and sulfur on 10 inch rolls and was discharged therefrom as a sheet-like material. The sheet-like material was then vulcanized in a mold at a temperature of 145° C. for 40 minutes to obtain a vulcanizate. The results are summarized in Tables 1 and 2.

Separation and Determination of Graft Ratio

Two grams of the reinforced rubber composition obtained in Example 1 was added to 200 ml of benzene at a room temperature and the rubber content in the composition was dissolved in the benzene. The slurry thus obtained was centrifugally separated into a solution portion and a precipitation portion. The precipitation portion was repeatedly subjected to the above-mentioned procedure seven times. Thereafter, the final precipitation portion was dried to obtain nylon fiber. The nylon fiber thus obtained was dissolved in a mixed solvent of phenol and orthodichlorobenzene (a weight ratio of 1:3) and was analyzed according to an 'H nuclear magnetic resonance (NMR) spectrum analysis by using as an internal standard tetramethylsilane. From the NMR chart, a mol ratio of 6-nylon and natural rubber was determined by a measurment of the area of the signals of the methyl and methylene groups derived from natural rubber, the methylene group adjacent to the CO group, the methylene group adjacent to the NH group and the other three methylene groups, derived from 6-nylon. Thus, the graft ratio was calculated.

The shape of the nylon fiber was determined by observing about 200 nylon fibers under a scanning electron microscope at a magnification time of 10000. The fiber was extremely fine and short, having a circular cross-section.

The results are shown in Table 1.

EXAMPLE 2

A reinforced rubber composition (sample 2) was prepared in the same manner as in Example 1, except that a novolak type lactam-bisphenol F-formaldehyde resin precondensate was used as the novolak. The lactam-bisphenol F-formaldehyde resin precondensate was prepared as follows:

One hundred and forty one parts of $\epsilon$-caprolactam and 55.6 parts of paraformaldehyde having a purity of 81% were allowed to react at a temperature of 120° C. for 5 hours to obtain an addition reaction solution containing the addition reaction product of $\epsilon$-caprolactam and formaldehyde. The total amount of the addition reaction solution was gradually and dropwise added to a mixture of 315 parts of bisphenol F, 32 parts of water, and 1.6 parts of 35% hydrochloric acid, and the addition product of $\epsilon$-caprolactam and formaldehyde and bisphenol F were subjected to a condensation reaction. Then, the reaction mixture was distilled at a temperature of 180° C. under a reduced pressure (10 mmHg). Thus, the desired novolak type lactam-bisphenol F-formaldehyde precondensate was obtained.

Then, a cord-coating rubber composition was prepared in the same manner as in Example 1, except that the reinforced rubber composition obtained above was used.

The results are shown in Tables 1 and 2.

EXAMPLE 3

A reinforced rubber composition (sample 3) was prepared in the same manner as in Example 1, except that a novolak type styrenated phenol-phenol-formaldehyde resin precondensate was used as the novolak. The used precondensate was prepared as follows:

One thousand and forty one parts of styrene was gradually and dropwise added to a mixture of 1412 parts of phenol and 40.3 parts of 35% hydrochloric acid, and then the mixture was mixed at a temperature of 130° C. for 2 hours to obtain styrenated phenol. The styrenated phenol was recovered from the reaction mixture by a vacuum distillation under the conditions of 180° C. and 40 mmHg. To the total amount of the styrenated phenol thus obtained, 1426 parts of formalin and 87 parts of a 40% aqueous sodium hydroxide solution were added and the mixture was mixed at a temperature of 80% for 5 hours to effect addition of the formaldehyde to the styrenated phenol (i.e., the methylol styrenated phenol was formed). To the total amount of the addition product thus obtained, 1653 parts of phenol and 123 parts of oxalic acid were added. Thus, a condensation reaction of the methylol styrenated phenol and phenol was effected at a temperature of 100° C. for 2 hours. The desired styrenated phenol-phenol-formaldehyde resin precondensate having a softening point (according to a ring and ball method) of 73° C. was recovered from the reaction mixture by a vacuum distillation method under the conditions of 100° C. to 180° C. and 40 mmHg.

Then, a cord-coating rubber composition was prepared in the same manner as in Example 1, except that the reinforced rubber composition obtained above was used.

The results are shown in Tables 1 and 2.

EXAMPLE 4

A reinforced rubber composition (sample 4) was prepared in the same manner in Example 1, except that the amount of the 6-nylon charged to the natural rubber was changed to 100 parts.

A cord-coating rubber composition having the formulation shown in Table 2 was prepared by using the reinforced rubber composition obtained above.

The results are shown in Tables 1 and 2.

EXAMPLE 5

A reinforced rubber composition (sample 5) was prepared in the same manner as in Example 1, except that the amount of the 6-nylon charged to the natural rubber was changed to 20 parts.

A cord-coating rubber composition having the formulation shown in Table 2 was prepared by using the reinforced rubber composition obtained above.

The results are shown in Tables 1 and 2.

EXAMPLES 6 to 9

Cord-coating rubber compositions were prepared in the same manner as in Example 1, except that the compounding ratios of the components were changed as shown in Table 2.

The results are shown in Table 2.

EXAMPLES 10 to 13

Example 1 was repeated, except that the type of the carbon black to be compounded was changed.

The results are shown in Table 2.

Comparative Example 1

A cord-coating rubber composition was prepared in the same manner as in Example 1, except that the reinforced rubber composition was not used and the ratio of the components was changed as shown in Table 2.

The results are shown in Table 2.

TABLE 1

| Reinforced rubber composition | Sample 1 | Sample 2 | Sample 3 | Sample 4 | Sample 5 |
|---|---|---|---|---|---|
| Average diameter of fiber ($\mu$m) | 0.1 | 0.1 | 0.1 | 0.1 | 0.1 |
| Shortest length of fiber ($\mu$m) | $\geq$10 | $\geq$10 | $\geq$10 | $\geq$10 | $\geq$10 |
| Graft ratio (% by weight) | 15 | 13 | 14 | 13 | 16 |

The length of the nylon fibers buried in each reinforced rubber composition of samples 1 to 5 is about 200 $\mu$m or less (calculated).

TABLE 2

| | | | Example 1 | Example 2 | Example 3 | Example 4 | Example 5 | Example 6 | Example 7 |
|---|---|---|---|---|---|---|---|---|---|
| Formulation | Reinforced rubber composition | Type | sample 1 | sample 2 | sample 3 | sample 4 | sample 5 | sample 1 | sample 1 |

TABLE 2-continued

| (note 4) | | | | | | | | | |
|---|---|---|---|---|---|---|---|---|---|
| | NR | Amount (part) | 15 | 15 | 15 | 10 | 30 | 15 | 15 |
| | BR (note 1) | Amount (part) | 60 | 60 | 60 | 95 | 75 | 70 | 70 |
| | SBR (note 2) | Amount (part) | 30 | 30 | 30 | 0 | 0 | 20 | 20 |
| | Carbon black | Type | 0 | 0 | 0 | 0 | 0 | 0 | 0 |
| | (note 3) | | N-330 | N-330 | N-330 | N-330 | N-330 | N-330 | N-330 |
| | | Amount (part) | 60 | 60 | 60 | 60 | 60 | 55 | 60 |
| Ratio of nylon to total rubber content (PHR) | | | 5 | 5 | 5 | 5 | 5 | 5 | 5 |
| Cord-coating rubber composition $M_{L+4}$ | | (100° C.) | 60 | 60 | 62 | 63 | 62 | 54 | 61 |
| Cord-coating rubber composition $M_{L+4}$ | | Swell ratio | 1.4 | 1.4 | 1.4 | 1.4 | 1.4 | 1.5 | 1.4 |
| Cord-coating rubber composition $M_{L+4}$ | | 100% green modulus (kg/cm$^2$) | 12 | 12 | 12 | 18 | 18 | 14 | 17 |
| Vulcanizate | $M_{100}$ (kg/cm$^2$) | | 65 | 63 | 65 | 81 | 78 | 65 | 70 |
| " | Tensile strength (kg/cm$^2$) | | 258 | 257 | 260 | 288 | 286 | 271 | 268 |
| " | Tear strength (kg/cm) | | 85 | 80 | 83 | 98 | 98 | 97 | 88 |
| " | Peeling strength (kg) | | >50 | >50 | >50 | >50 | >50 | >50 | >50 |
| " | Bonding strength to a metal (kg) | | 12 | 12 | 12 | 14 | 14 | 13 | 13 |

| | | | Example 8 | Example 9 | Example 10 | Example 11 | Example 12 | Example 13 | Comparative Example 1 |
|---|---|---|---|---|---|---|---|---|---|
| Formulation composition (note 4) | Reinforced rubber | Type | sample 1 | sample 1 | sample 1 | sample 1 | sample 1 | sample 1 | — |
| | NR | Amount (part) | 30 | 15 | 9 | 9 | 9 | 9 | 80 |
| | BR (note 1) | Amount (part) | 60 | 70 | 94 | 94 | 94 | 94 | 20 |
| | SBR (note 2) | Amount (part) | 20 | 0 | 0 | 0 | 0 | 0 | 0 |
| | Carbon black | Type | 0 | 20 | 0 | 0 | 0 | 0 | 0 |
| | (note 3) | | N-330 | N-330 | N-110 | N-220 | N-330 | N-440 | N-330 |
| | | Amount (part) | 50 | 60 | 60 | 60 | 60 | 60 | 70 |
| Ratio of nylon to total rubber content (PHR) | | | 10 | 5 | 3 | 3 | 3 | 3 | 0 |
| Cord-coating rubber composition $M_L+4$ | | (100° C.) | 49 | 63 | 65 | 65 | 62 | 57 | 75 |
| Cord-coating rubber composition $M_L+4$ | | Swell ratio | 1.4 | 1.3 | 1.4 | 1.4 | 1.5 | 1.5 | 1.5 |
| Cord-coating rubber composition $M_L+4$ | | 100% green modulus (kg/cm$^2$) | 28 | 15 | 19 | 18 | 18 | 18 | 6 |
| Vulcanizate | $M_{100}$ (kg/cm$^2$) | | 88 | 73 | 71 | 72 | 68 | 63 | 47 |
| " | Tensile strength (kg/cm$^2$) | | 263 | 278 | 284 | 287 | 291 | 275 | 276 |
| " | Tear strength (kg/cm) | | 92 | 94 | 97 | 98 | 101 | 96 | 95 |
| " | Peeling strength (kg) | | >50 | >50 | >50 | >50 | >50 | >50 | >50 |
| " | Bonding strength to a metal (kg) | | 12 | 13 | 15 | 14 | 14 | 13 | 11 |

(Note 1) BR: polybutadiene (VBEPOL-BR 100, manufactured by Ube Kosan Co., Ltd.)
(Note 2) SBR: styrene-butadiene copolymer rubber (SBR-1500, manufactured by Nippon Gosei Gomu Co., Ltd.)
(Note 3)

| | Particle diameter mμ | DBP oil absorption ml/100 g |
|---|---|---|
| N-110: SAF | 85 | 115 |
| N-220: ISAF | 21 | 117 |
| N-330: HAF | 30 | 110 |
| N-440: FF | 38 | 75 |

(Note 4) Other compounding agent
zinc oxide: 7 parts, stearic acid: 2 parts, cobalt stearate: 3 parts, antioxidant N—phenyl-N'—isopropyl-p-phenylenediamine: 2 parts, vulcanization accelerator N—oxydiethylenebenzothiazyl-2-sulfenamide: 0.8 part, aromatic oil: 10 parts, sulfur: 1.5 parts

We claim:

1. A rubber composition for coating a tire cord comprising:

(A) a reinforced rubber composition comprising vulcanizable rubber having dispersed therein 5 to 100 parts by weight per 100 parts by weight of vulcanizable rubber, of fine short fibers of thermoplastic polymer having

groups in the polymer molecule, said vulcanizable rubber and said thermoplastic polymer being grafted to each other through a phenol formaldehyde resin precondensate at an interface of the fiber;

(B) a diene rubber;
(C) carbon black; and
(D) 0.1 to 10 parts by weight, per 100 parts by weight of a total amount of the rubber constituents, of a cobalt salt of an organic carboxylic acid having 6 or more carbon atoms, wherein the following conditions (i) to (iv) are satisfied:

(i) the amount of said thermoplastic polymer is 1 to 15 parts by weight per 100 parts by weight of the total amount of the rubber constituents;

(ii) the ratio of the rubber is such that the total amount of natural rubber or polyisoprene in the component (A) and the component (B) is 100% to 65% by weight;

(iii) the amount of the carbon black is 50 to 70 parts by weight per 100 parts by weight of the total amount of the rubber constituents; and (iv) the vulcanizate derived from the rubber composition has a 100% modulus of at least 60 kg/cm2.

2. A rubber composition as claimed in claim 1, wherein said carbon black has a particle diameter of 90 mμ or less and a dibutyl phthalate oil absorption of 70 ml/100 g or more.

3. A rubber composition as claimed in claim 1, wherein the vulcanizate derived from said rubber composition has a bonding strength to a metal, determined according to an ASTM D 2229 method, of 7 to 30 kg.

* * * * *